United States Patent
Michel

[15] 3,693,953
[45] Sept. 26, 1972

[54] APPARATUS AND METHOD OF FORMING A LIQUID CURTAIN AND THERMAL GRADIENT CONTROL SYSTEM

[72] Inventor: George H. Michel, Glendora, Calif.
[73] Assignee: Armorlite Lens Company, Inc., Burbank, Calif.
[22] Filed: May 27, 1971
[21] Appl. No.: 147,509

[52] U.S. Cl. .......................263/50, 134/34, 134/75
[51] Int. Cl. ..........................................F27d 23/00
[58] Field of Search .....263/50, 11; 266/4 A; 134/34, 134/75, 105, 108; 165/1, 135; 99/361; 210/7; 61/1, 6

[56] References Cited

UNITED STATES PATENTS

| | | |
|---|---|---|
| 2,092,433 | 9/1937 | Thompson....................99/361 |
| 2,333,544 | 11/1943 | Meyer........................99/361 |
| 2,857,153 | 10/1958 | Knight.....................263/50 X |
| 3,103,788 | 9/1963 | Gross..........................61/6 |
| 3,234,123 | 2/1966 | Hinde..........................210/7 |
| 3,469,402 | 9/1969 | Lowd..........................61/1 |
| 3,651,646 | 2/1972 | Grunau........................61/6 |

Primary Examiner—Charles J. Myhre
Attorney—Sellers and Brace

[57] ABSTRACT

Apparatus and method of forming a liquid curtain and of utilizing the same to segregate a body of fluid into distinct zones and utilize the same to provide a thermal gradient control system. Items undergoing processing can be conveyed in succession from zone to zone through the liquid curtains without interfering with the integrity of the thermal gradient. In one typical embodiment the chamber comprises a long tank of liquid portions of which are withdrawn from one edge of the curtains and returned under pressure to rows of jets along curtain edges remote from the first mentioned edge. The liquid curtains provide simple, highly effective means for isolating zones of the liquid from one another and permitting these zones to be maintained at different desired temperatures while in use to process items conveyed therethrough. The liquid may be readily maintained at different temperature gradients of both a linear and non-linear nature by appropriate use of the invention principles.

42 Claims, 2 Drawing Figures

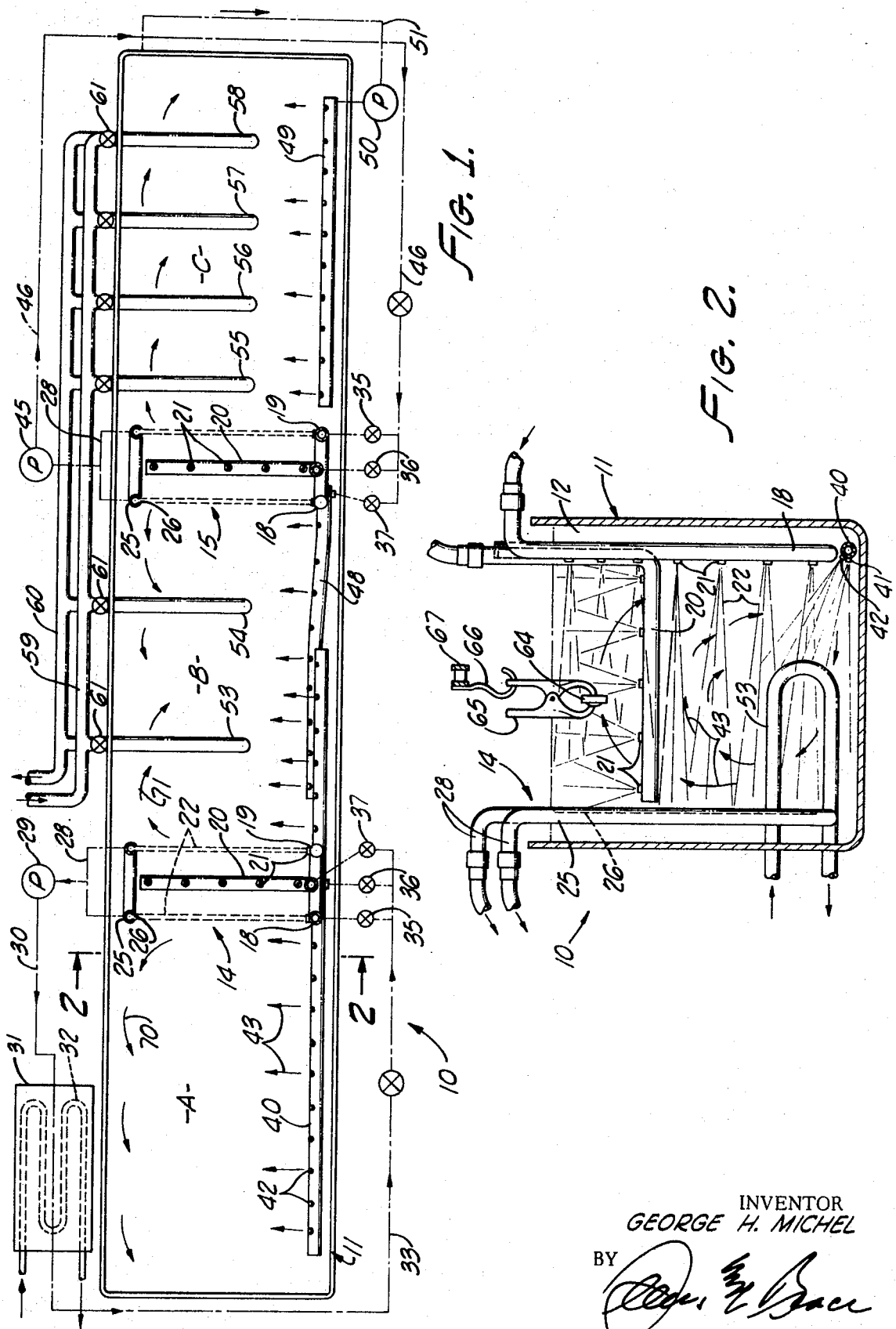

APPARATUS AND METHOD OF FORMING A LIQUID CURTAIN AND THERMAL GRADIENT CONTROL SYSTEM

This invention relates to temperature control system, and more particularly to novel apparatus and methods of maintaining different portions of a chamber or tank at different temperatures without interference with the passage of items undergoing processing through the several temperature zones.

The processing of numerous articles of manufacture need to be subjected to different temperatures during different stages of a heat treating operation. For example, the curing of various thermosetting thermoplastic material should be carried out under varying temperature gradients of a critical nature to provide an end product having desired properties and characteristics. Heretofore such processes have necessitated the use of ovens equipped with automated variable temperature controls. The use of such ovens is subject to serious shortcomings for various reasons including the fact that the curing of certain plastic products, such as precision optical lenses, should be carried out in a non-gaseous atmosphere and secondly, the use of temperature controlled ovens is not feasible when using conveyor equipment to conduct the product through the oven. Curing such items in a liquid bath precludes the entrance of gas into the part mold being processed but such baths, of the types heretofore proposed, are subject to serious shortcomings because of the need for providing separate baths for each temperature condition and the need for elaborate conveyor mechanism and temperature control expedients. Furthermore, it has not been feasible to employ such prior art liquid baths to carry out product processing operations utilizing an endless conveyor to carry the product in succession along a path subject to a selected temperature gradient irrespective of whether this gradient is linear or non-linear.

In view of the foregoing and other shortcomings and disadvantages typifying prior practice, there is provided by this invention a simple, easily operated, readily controlled, fully automatic apparatus and method of providing a temperature gradient control system for use in processing any of a wide variety of articles of manufacture. The invention system makes use of an elongated liquid bath all parts of which are in open and free communication and along which the articles being processed can be conveyed while continuously submerged and subjected to a chosen thermal gradient. These objectives are accomplished in major part by the use of a unique liquid curtain disposed at intervals crosswise of the body of liquid. These curtains utilize at least one, and preferably multiple, sheet-like streams of liquid withdrawn from the main body of liquid and jetted crosswise of the tank. These liquid curtains isolate the ends of adjacent zones from one another without interfering in any degree with the passage therethrough of the items undergoing processing. The liquid used to energize these curtains is preferably withdrawn from the main body along an edge of the tank remote from the jets forming the curtains and may be passed in heat exchange with a heat exchange medium before being repressurized and returned to the inlet side of the curtain. The suction withdrawal of the liquid aids materially in extending the effective length of the liquid curtain and in maintaining its integrity while at the same time aiding circulation of liquid lengthwise of the adjacent zone. In a preferred arrangement of the liquid curtain, two sheet-like streams of liquid are formed flowing in the same horizontal direction crosswise of the tank and closely beside a third sheet-like stream flowing vertically.

Other features of the invention include the recirculation of a portion of the confined liquid through jetting nozzles distributed lengthwise of the body of liquid and so directed as to circulate the liquid in each zone about a horizontal axis extending lengthwise of that zone. This circulation may be conducted in a heat exchange relation to heating or cooling coils located out of the path of the articles undergoing processing. The spacing of these heat exchange units and the amount and temperature of the fluid being passed therethrough may be regulated as desired to achieve a desired temperature gradient lengthwise of the tank.

Accordingly, it is a primary object of the present invention to provide a confined body of liquid having simple, highly versatile means for controlling the temperature gradient lengthwise of the body while leaving at least the upper layers of the body unobstructed for the conveyance therethrough of particles undergoing heat treatment.

Another object of the invention is the provision of a novel structure and method of maintaining different portions of a single body of liquid effectively isolated from one another temperature-wise by a generally planar liquid curtain.

Another object of the invention is the provision of a simple highly effective method of dividing a long tank of liquid into temperature zones by a curtain of pressurized liquid derived from contiguous portions of these zones.

Another object of the invention is the provision of improved apparatus and method for maintaining a long narrow tank of liquid at a desired temperature gradient by introducing a multiplicity of streams of liquid derived from the tank and returned thereto under pressure and in such manner as to achieve a desired temperature gradient while leaving the upper portion of the liquid unobstructed for the conveyance of continuously submerged articles undergoing heat treatment therealong.

Another object of the invention is the provision of an improved apparatus and method of curing polymerizable thermoplastic material under desired varying temperature conditions while in movement continuously submerged in a liquid bath maintained at different temperatures in different portions thereof.

Another object of the invention is the provision of an apparatus and method for curing a multiplicity of precision plastic lens components conveyed submerged in a liquid through differentially heated zones arranged in end to end relation and separated from one another by liquid curtains located transversely of the path of travel.

These and other more specific objects will appear upon reading the following specification and claims and upon considering in connection therewith the attached drawing to which they relate.

Referring now to the drawing in which a preferred embodiment of the invention is illustrated:

FIG. 1 is a top plan view of equipment suitable for practicing the principles of this invention; and FIG. 2 is a cross sectional view taken along line 2—2 on FIG. 1.

Referring to FIGS. 1 and 2, there is shown one typical embodiment of the invention apparatus designated generally 10. A deep, long, narrow tank 11 is filled to a suitable depth with a liquid, such as water 12. Tank 11 is free of partitions or other dividing walls throughout its length but is effectively divided into a plurality of different temperatures zones A, B and C by liquid curtain assemblies such as those indicated at 14 and 15. As herein shown, each of the liquid curtains is of the same construction and, for this reason, the same reference characters will be used to designate the similar parts of each.

Each liquid assembly includes a pair of vertical headers 18,19 extending vertically along one side wall of the tank and a third header 20 extending horizontally crosswise of the tank in a plane between headers 18,19. Each of these headers is equipped with a series of nozzles 21 designed to cooperate with one another in creating a substantially sheet-like stream of liquid lying in a vertical plane extending transversely of tank 11. Although jets 21 are shown spaced some distance from one another along the headers it will be understood that they may be spaced closer together than indicated in the drawings if this is found necessary under prevailing adverse operating conditions to prevent migration of the liquid across the liquid curtain barrier.

Cooperating with vertical headers 18,19 is a suction header here shown as comprising U-shaped tubing 25 having its two legs extending vertically along the interior sidewall of the tank directly opposite a respective one of headers 18, 19. Suction header 25 is provided with a slotted intake opening 26 facing toward headers 18,19 respectively and effective to withdraw liquid from the spent ends of the two liquid streams flowing horizontally crosswise of the tank from headers 18,19.

The water so withdrawn is conducted through tubing 28 into the inlet side of a motor driven pump 29. Water from the discharge side of this pump flows through conduit 30 into heat exchanger 31 where the liquid temperature is modified either by heating or cooling to a desired temperature by a tempering liquid flowing through the closed circuit 32. The pressurized liquid so tempered to a desired temperature then passes under pressure through conduit 33 to the inlet side of the liquid curtain assembly 14 and elsewhere as will be described. Thus, water from return conduit 33 passes through a regulating valve 35 into ducting feeding headers 18,19. Another valve controlled conduit 36 supplies liquid to horizontal header 20 and a third valve control 37 supplies pressurized liquid to a manifold 40 extending along one lower lateral corner of tank 11, such as that indicated by way of example in FIG. 2. This header is provided with two rows of jetting orifices or nozzles 41,42 arranged to jet returning liquid crosswise and upwardly through the liquid in the tank along the paths thus indicated by the arrows 43 in FIG. 2. The lower row of nozzles 41 directs the liquid at a slight angle to the horizontal crosswise of the lower portion of the tank whereas jets 42 direct the water upwardly at a substantially greater angle. It will therefore be apparent that these jets tend to cooperate in rolling the liquid within each of the temperature zones A, B and C about an axis extending lengthwise of that zone.

As herein shown by way of example, the liquid curtain assembly 15 is energized by liquid withdrawn from the tank in a slightly different manner. Thus the suction manifold 25 of that subassembly is connected through conduit 28 to the inlet of a pump 45 which returns pressurized liquid directly to the pressure side of the liquid curtain headers without passing through a heat exchanger. The return pipe 46 in connected through separate control valves to headers 18,19 whereas a third control valve 37 regulates the return of pressurized water to a liquid circulating header 48 likewise fitted with two rows of jetting nozzles arranged in the same manner described above in connection with nozzles 41,42 of header 40.

A third water circulating header 49 is located in the lower corner of zone C and is supplied with pressurized water from the delivery side of a recirculating pump 50 having corner inlet connected to a pipe 51 opening into tank 11 through its right hand end wall as viewed i FIG. 1.

Heaters effective to maintain the water in zones A, B and C at desired temperature differentials include the heat exchanger 31 for the liquid being circulated to curtain assembly 14 and a series of heat exchangers 53 through 58 spaced at intervals along the lower portion of the tank. It will be understood that the number, spacing and location of heat chambers 53-58 may vary widely depending upon the particular temperature gradients desired in different zones of the tank for a particular heat processing operation. As here shown, each of the heat exchangers is connected to supply and return headers 59,60 in circuit with a suitable source of heat, such as steam, hot water, cold water, or the like. The inlet of each heat exchanger preferably includes a regulating valve 61.

In the particular arrangement here shown, the apparatus is constructed and arranged to provide a liquid curing bath for plastic lenses. Individual ones of the lenses are contained in mold assemblies 64 of well known type here shown as supported in a spring biased set of clamping tongs 65. One operating handle of these tongs has a hole for convenience in supporting the tongs and the mold from one of the hooks 66 distributed along a chain conveyor 67 extending lengthwise immediately about the liquid level in tank 11. The details of this conveyor system are not shown since they are well known to persons skilled in this art.

The molds enter the liquid close to the left hand end of zone A and remain fully submerged while being advanced slowly and in succession through zones A, B and C by which time the monomer charge of the molds is fully cured. The illustrative embodiment of the invention herein described has been found highly effective and stable in maintaining a substantially linear temperature gradient in tank 11 with an entrance temperature of close to 100° F. and an exit temperature of 180° F. Owing to the low temperature at the entrance end it was not found n necessary to heat zone A other than by the liquid being recirculated to energize the circulating jets 41,42 and liquid curtain assembly 14, the necessary heat being derived from heat exchanger 31. Each of the liquid curtains directed horizontally crosswise of the tank from headers 18,19 are found to promote circulation lengthwise of the zones to either side thereof and generally as indicated by arrows 70,71 (FIG. 1). This circulation is also further promoted by the liquid curtain rising from header 20. This liquid likewise tends to be dispersed laterally toward the opposite ends of the tank for reasons which will be readily apparent to the reader. This gentle, lateral circulation of the liquid aids in maintaining a variable temperature gradient lengthwise of the zones. Uniformity of the conditions in each zone is further promoted by the circulation from manifolds 40, 48 and 49 acting in cooperation with heat exchangers 53 to 58.

In other applications of the principles disclosed herein, other than linear temperature gradients will be desirable lengthwise of the liquid bath. Such results can be readily achieved by utilizing an appropriate number and disposition of the liquid curtains, a different arrangement of the heat exchanges and by proper control of the heating fluid or cooling fluid depending upon which is used in a particular heat exchanger. By applying the principles of this invention it is possible to heat separate transversely extending vertical portions of a single body of liquid to different temperatures for use in the heat processing of an article of manufacture while being conveyed crosswise of the respective vertical portions of the liquid each maintained at a desired temperature of a selected thermal gradient. At intervals and particularly between the adjacent ends of larger zones of the liquid desired to be maintained at substantially different thermal gradients, it is desirable to employ the invention liquid curtain thereby preventing or greatly minimizing the transfer of liquid between zones.

It will be understood that transfer of the described liquid curtains to different locations along the tank can be facilitated by the use of flexible conduits or other suitable means for connecting these curtains to the respective supply and liquid return conduits. Likewise additional jet-equipped liquid circulating conduits corresponding in construction and function to conduits 40, 48, 49 may be installed in one or more portions of the tank and arranged to supplement the latter in circulating the liquid about vertical planes extending transversely of the tank.

While the particular apparatus and method of forming a liquid curtain and thermal gradient control system herein shown and disclosed in detail is fully capable of attaining the objects and providing the advantages hereinbefore stated, it is to be understood that it is merely illustrative of the presently preferred embodiments of the invention, and that no limitations are intended to the detail of construction or design herein shown other than as defined in the appended claims.

I claim:

1. That method of separating a body of confined liquid into different horizontal zones arranged in end to end relation and at distinctly different temperatures for use in heat treating an item submerged therein and passing through said zones in succession which method comprises: separating adjacent zones of said liquid from one another by a flowing curtain of said liquid extending transversely of and between the adjacent ends of said zones for a major portion of the depth thereof.

2. That method defined in claim 1 characterized in the steps of forming said liquid curtain by liquid introduced into said body of liquid for flow in a sheet-like stream of liquid flowing transversely of said body of liquid in a plane separating said adjacent zoned from one another, and simultaneously withdrawing liquid from said body thereof along an edge of said separating plane remote from the edge along which said sheet of liquid is introduced.

3. That method defined in claim 1 characterized in forming said separating curtain of liquid of a plurality of closelyspaced vertically disposed sheet-like streams of liquid lying substantially parallel to one another.

4. That method defined in claim 3 characterized in the step of passing said sheet-like streams of liquid transversely of said zones in directions generally at right angles to one another.

5. That method defined in claim 4 characterized in the step of introducing said sheet-like streams of liquid into said body thereof from distribution points adjacent at least one periphery of the separating plane between said adjacent zones of liquid.

6. That method defined in claim 3 characterized in that one of said sheet-like streams flows vertically between a plurality of sheet-like streams flowing generally horizontally transversely between said adjacent zones of liquid.

7. That method defined in claim 3 characterized in the step of dispersing some of the liquid from said horizontally flowing streams away from one another and into the adjacent one of said zones.

8. That method defined in claim 7 characterized in the step of introducing jets of liquid into at least certain ones of said zones to circulate liquid in said zones.

9. That method defined in claim 1 characterized in the step of gently circulating the liquid in at least one of said zones.

10. That method defined in claim 1 characterized in the step of supplying liquid at a predetermined temperature to said liquid curtains which temperature is closely related to the temperature of the liquid in the adjacent one of said zones.

11. That method defined in claim 1 characterized in the step of introducing jets of liquid into said body of liquid at a plurality of points spaced different distances from said liquid curtain and in a direction tending to circulate the liquid in a given one of said zones in vertical planes lying generally parallel to said liquid curtain.

12. That method defined in claim 11, characterized in the step of introducing said liquid jets from the side of a distributing manifold extending generally normal to the plane of said liquid curtain and offset from the path of items undergoing processing by passage through said zones in succession.

13. That method defined in claim 1 characterized in the step of passing fluid in heat exchange with the liquid in a plurality of areas of liquid in respective ones of said zones and having a temperature so related to the desired liquid in each of said areas as to compensate for heat losses thereby to maintain the temperature in each area at desired respective temperatures.

14. That method of maintaining a single unpartitioned body of confined liquid at different temperatures in different portions thereof while conveying items undergoing processing through successive zones thereof which method comprises: dividing said zones from one another by flowing liquid curtains, and passing liquid from said portions in heat exchange with heat exchange means under conditions effective to maintain liquid in contiguous vertical portions of said confined liquid at a desired temperature level and different from he temperature in other of said vertical portions.

15. That method defined in claim 14 characterized in that said confined body of liquid is many times longer than the width or depth thereof.

16. That method defined in claim 15 characterized in that said liquid curtain lies in a narrow vertical plane extending transversely of the length of said body of liquid.

17. That method defined in claim 16 characterized in that the liquid curtain between adjacent ones of said zones includes a plurality of closely spaced sheet-like streams of liquid flowing crosswise of said confined body of liquid.

18. That method defined in claim 17 characterized in the step of forming another sheet-like stream of liquid flowing vertically between said plurality of sheet-like streams flowing crosswise of said body of liquid.

19. That method defined in claim 18 characterized in the step of withdrawing liquid from said liquid curtain on a periphery thereof remote from the point of liquid entrance to form said liquid curtain.

20. That method defined in claim 14 characterized in the step of heating said liquid differentially in each of said zones, and utilizing said liquid curtain in cooperation with the differential heating of the zones to either side thereof to maintain a desired different temperature in the respective zones of said single confined body of liquid.

21. That method defined in claim 14 characterized in the step of adding heat differentially to the liquid in said plurality of zones separated from one another by said liquid curtain thereby to maintain a desired temperature gradient from end to end of said confined body thereof.

22. That method defined in claim 21 characterized in the step of adding heat to said liquid in different transverse portions thereof as necessary to maintain a substantially linear temperature gradient from one end to substantially the other end thereof.

23. That method defined in claim 22 characterized in the step of advancing a polymerizable polymer from zone to zone of said confined body of liquid while maintaining the same submerged from the time of entry into said liquid until finally withdrawn therefrom.

24. That method defined in claim 22 characterized in advancing a series of lens molds charged with uncured polymer in succession through successive zones of said confined body of liquid and through successive liquid curtains between the ends of adjacent zones whereby said molds remain continuously submerged during curing.

25. That method defined in claim 14 characterized in the steps of withdrawing liquid from the zone of said liquid curtain and passing the same in heat exchange with a medium at a different temperature before returning said withdrawn liquid under pressure to the inlet edge of said liquid curtain.

26. That method defined in claim 14 characterized in the step of withdrawing liquid from the zone of said liquid curtain and jetting the same crosswise of at least one zone of said confined body of liquid thereby to circulate liquid in said one zone generally about a horizontal axis extending between the opposite ends of said zone.

27. That method defined in claim 26 characterized in the step of using said sheet-like streams of liquid to circulate the liquid in said one zone in heat exchange with a heating medium.

28. Apparatus for subjecting conveyor-supported items to processing in a liquid bath under controlled temperature conditions, said apparatus comprising a relatively long narrow tank of liquid, means for jetting liquid transversely of said tank to form sheet-like liquid curtains separating the tank into a plurality of liquid zones and including means for maintaining the liquid in each of said zones at different temperatures.

29. Apparatus as defined in claim 28 characterized in that a substantial depth of the mid portion of the upper layers of said liquid is free of obstructions and free for the conveyance of submerged items therethrough from end to end of said tank.

30. Apparatus as defined in claim 28 characterized in that said liquid jetting means for each liquid curtain comprises at least two sets of jets arranged in closely spaced vertical planes with their outlets directed transversely of said tank.

31. Apparatus as defined in claim 30 characterized in that each of said liquid curtains includes one set of jets directed generally horizontally across said tank and one set of jets directed generally vertically closely beside said horizontally directed jets.

32. Apparatus as defined in claim 30 characterized in that one of said liquid curtains includes two sets of horizontally directed jets spaced closely beside the opposite faces of an intervening third set of jets directed vertically through the liquid in said tank.

33. Apparatus as defined in claim 28 characterized in the provision of means for recirculating liquid from said tank through said liquid curtain jetting means.

34. Apparatus as defined in claim 28 characterized in that said liquid curtains include recirculating pump means operating to withdraw liquid from that margin of said liquid curtain located remotely from said jetting means and to return withdrawn liquid to said jetting means under pressure.

35. Apparatus as defined in claim 34 characterized in the provision of means for passing said withdrawn liquid in heat exchange with a fluid at a different temperature.

36. Apparatus as defined in claim 35 characterized in the provision of means for distributing a portion of said recirculating liquid to a selected one of said zones at points spaced different distances from one of said liquid curtains.

37. Apparatus as defined in claim 36 characterized in that said liquid distributing means includes liquid jets disposed and effective to circulate the liquid in said selected zone about a horizontal axis extending lengthwise thereof.

38. Apparatus as defined in claim 28 characterized in the provision of heat exchange means located at spaced intervals crosswise of at least one of said zones for varying the temperature of different transverse vertical subdivisions of said zone to compensate for heat losses.

39. Apparatus as defined in claim 30 characterized in the provision of suction means arranged vertically along the side of said tank remote from but opposite a respective set of said liquid jetting means and effective to assure the continuity and integrity of said liquid curtains transversely of said long tank.

40. Apparatus as defined in claim 38 characterized in that said heat exchange means and said liquid curtain means cooperate in maintaining a substantially linear temperature gradient from end to end of said tank.

41. Apparatus as defined in claim 40 characterized in the provision of a plurality of said liquid curtain means spaced from one another along the length of said tank and cooperating with the tank ends and with one another to divide the tank into a series of temperature zones separated only by sheet-like liquid streams provided by each of said liquid curtain means.

42. Liquid curtain apparatus effective to provide a barrier crosswise of chamber means, said apparatus comprising first flow-confining means extending along one wall of said chamber means equipped with means for jetting a sheet-like layer of liquid crosswise of said chamber to separate the latter into separate sub-chambers, means to collect and remove the liquid jetted across said chamber and to return the same to said header means under pressure, and means for maintaining said sub-chambers at different temperatures.

* * * * *